Patented Aug. 30, 1932

1,874,373

UNITED STATES PATENT OFFICE

ALBERT KELVIN SMITH, OF SHAKER HEIGHTS VILLAGE, AND WILLIAM R. VEAZEY, OF CLEVELAND HEIGHTS, OHIO, ASSIGNORS TO THE DOW CHEMICAL COMPANY, OF MIDLAND, MICHIGAN, A CORPORATION OF MICHIGAN

DEHYDRATION OF MAGNESIUM CHLORIDE

No Drawing. Application filed June 21, 1929. Serial No. 372,796.

The present invention relates to processes for dehydrating magnesium chloride and in particular to a process that involves drying the hydrated salt directly in a current of heated air or of products of combustion of fuel wherein such air-drying is carried to the point at which a more extensively dehydrated material is produced than has been prepared by heretofore known processes.

In U. S. Patent 1,479,982 to Collings and Gann a process of dehydrating magnesium chloride is described which consists in drying the normal hydrated salt, $MgCl_2.6H_2O$, in air through an intermediate stage, wherein the tetrahydrate, $MgCl_2.4H_2O$, is formed, to the dihydrate, $MgCl_2.2H_2O$, such dihydrate being then dried further in an atmosphere of hydrochloric acid to form successively the monohydrate, $MgCl_2.H_2O$, and finally the anhydrous salt. It has hitherto been thought necessary or essential to terminate the air-drying treatment at the stage where the dihydrate is produced, since previous investigations showed that drying further in air resulted in excessive decomposition of the salt accompanied by the formation of hydrochloric acid and magnesium oxide, or oxychloride, in accordance with equations (1), or (2);

(1)  $MgCl_2 + H_2O \rightleftharpoons MgO + 2HCl$ (2)  $MgCl_2 + H_2O \rightleftharpoons MgOHCl + HCl$ The purpose of carrying out the later stages of dehydration in a current of hydrochloric acid is to force the equilibrium in the above equations to the left and hence to limit or reduce the amount of decomposition that otherwise would accompany the dehydration of the salt.

We have now found, however, that a reaction according to equations (1), or (2), wherein the salt combines with free moisture in the atmosphere adjacent thereto, takes place substantially only with anhydrous magnesium chloride and not with any of the hydrated forms thereof. Until the drying has proceeded to the point where some of the anhydrous salt is formed, the formation of hydrochloric acid arises from internal reaction within one or other of the hydrated forms of the salts, as shown illustratively in equation (3);

(3)  $MgCl_2.2H_2O \rightarrow MgCl_2.H_2O + H_2O$

Decomposition accompanying the dehydration of the hydrated salts, therefore, is to be regarded as a uni-molecular reaction which occurs substantially independently of the nature of the atmosphere surrounding the salt during the drying process. Inasmuch as anhydrous magnesium chloride is formed directly in a process of the present character only by the dehydration of the monohydrate, $MgCl_2.H_2O$, it follows that there is no advantage theoretically or practically in employing an atmosphere of hydrochloric acid for drying the dihydrate to the monohydrate as in previous processes. We have found, in fact, that the dihydrate may be dried to the monohydrate in a current of heated air or of combustion gases with substantially no more decomposition than when the operation is conducted in an atmosphere of hydrochloric acid. We have also found that such monohydrate may be further dried exhaustively in air whereby an end product is obtained consisting of a mixture of anhydrous magnesium chloride and basic chloride, $MgOHCl$, which upon heating with dry hydrochloric acid gas may be converted to an anhydrous magnesium chloride product of high purity.

To the accomplishment of the foregoing and related ends, the invention, then, consists of the steps hereinafter fully described and particularly pointed out in the claims, the following description setting forth in detail a preferred mode of procedure for carrying out the invention, such disclosed procedure, however, being illustrative of but one of the various ways in which the principle of the invention may be used.

The dehydration of the normal hydrated magnesium chloride, $MgCl_2 \cdot 6H_2O$, may be represented as taking place in five separate stages, such dehydration being accompanied by a simultaneous process of decomposition, viz;

I. $MgCl_2 \cdot 6H_2O \rightarrow MgCl_2 \cdot 4H_2O + 2H_2O$
II. (a) $MgCl_2 \cdot 4H_2O \rightarrow MgCl_2 \cdot 2H_2O + 2H_2O$
   (b) $MgCl_2 \cdot 4H_2O \rightarrow MgOHCl + HCl + 3H_2O$
III. (a) $MgCl_2 \cdot 2H_2O \rightarrow MgCl_2 \cdot H_2O + H_2O$
   (b) $MgCl_2 \cdot 2H_2O \rightarrow MgOHCl + HCl + H_2O$
IV. (a) $MgCl_2 \cdot H_2O \rightarrow MgCl_2 + H_2O$
   (b) $MgCl_2 \cdot H_2O \rightarrow MgOHCl + HCl$
V. $MgOHCl + HCl \rightarrow MgCl_2 + H_2O$ In stage I decomposition, if it occurs at all, is practically negligible, in stage II it amounts only to about 1 to 2 per cent. and in stage III the greatest proportion of basic chloride, MgOHCl, formed is only on the order of about 20 per cent of the product. The first three stages have to do with the various hydrated forms of magnesium chloride only, hence in conformity with the findings of our investigations the amount of decomposition taking place therein is approximately constant and independent of the composition of the atmosphere in which drying is carried out. In stage IV drying in air may lead to decomposition about equal to or in excess of dehydration. Nevertheless, when that stage is carried out in air, under suitable conditions, a mixture of anhydrous chloride and basic chloride is obtained which may be readily converted completely to the anhydrous salt by subsequent treatment with hydrochloric acid. In practice stage IV may be carried out optionally in air or in an atmosphere of hydrochloric acid, while stage V, obviously, may be conducted only in an atmosphere of hydrochloric acid.

The present invention sets up a method and mode of procedure for carrying out stages I, II, III, and, if desired, stage IV also, in a current of heated inert gas, such as air or the products of the combustion of fuel, or under reduced pressure. Stages IV and V or stage V alone, need be carried out in an atmosphere of hydrochloric acid, whereas in all processes heretofore employed at most only stages I and II were conducted by air-drying, while at least stages III, IV and V were performed in a system employing an atmosphere of hydrochloric acid for removing water. When the dihydrate is dried in an atmosphere of hydrochloric acid, the acid takes up a relatively large volume of water from the salt, which water must then be separated therefrom and the dried acid gas recycled through the process. The separation of water from hydrochloric acid requires extensive and elaborate equipment that must be largely constructed of acid-proof materials. At best only about 75 to 80 per cent. of the moist acid can be recovered at each cycle by usual distillation methods as a substantially dry gas, owing to the formation of an azeotropic mixture containing about 20 per cent. hydrochloric acid which is withdrawn from the process. A process which involves the removal of only one molecule of water or less, instead of two or more, in an atmosphere of hydrochloric acid obviously possesses great commercial advantage.

In carrying out our invention normal hydrated magnesium chloride, $MgCl_2 \cdot 6H_2O$, is dried to the $4H_2O$ and $2H_2O$ stages, respectively, in any convenient way, as according to the method described in the patent to Collings et al, supra, wherein the salt is kept in the solid state through both stages. An alternative procedure consists in dehydrating the $6H_2O$ salt to the $4H_2O$ salt by fusing the former and evaporating at a temperature between about 169° and 193° C. and forming the fused product into small particles or flakes, as described in a pending patent application Serial No. 280,663, filed May 25, 1928, by A. K. Smith, one of the inventors herein, and then air-drying the so prepared $4H_2O$ salt by usual means to the $2H_2O$ salt. In general, the last named step is accomplished at temperatures rising to about 180° C., the latter figure representing the actual temperature of the material when discharged from the dryer.

Now, if drying of the $2H_2O$ salt, prepared as above, is continued in a current of hot air or the like, or under reduced pressure and the temperature of the material raised to about 230° C. and maintained at such point until substantially all of the $2H_2O$ salt has been converted, a product is obtained which consists of about 80 per cent. or more $MgCl_2 \cdot H_2O$, the balance being largely basic chloride, MgOHCl. Such product is referred to as $1H_2O$ salt.

When the aforesaid $1H_2O$ salt is dried further in air at temperatures above 230° C., either at atmospheric pressure or under reduced pressure, additional water is driven off, and finally an end product is obtained consisting of a mixture of anhydrous $MgCl_2$ and basic chloride which may contain from 25 to 50 per cent. anhydrous salt, depending upon various factors including the temperature and rate of drying. A relatively rapid drying rate favors the straight dehydration to the anhydrous chloride, while with a slower rate the amount of decomposition tends to increase. The rate of drying is promoted by operating under reduced pressure, i. e. in vacuum. For instance, when the drying in this stage was carried out under low pressure, e. g. 25 to 30 mm. of mercury, at temperatures between 250° and 290° C. we have obtained an end product consisting of as high as 55 to 56 per cent. anhydrous $MgCl_2$, the balance being substantially basic chloride. In general, the temperature of the material during this drying stage is maintained between about 230° and 300° C.

The end product, prepared in the foregoing manner, may be then heated further in a current of dry hydrochloric acid gas in a suitable reaction chamber, preferably at a temperature of 280° C. or somewhat higher and at atmospheric pressure, whereby the basic chloride content thereof is converted to anhydrous $MgCl_2$, and the water simultaneously formed as vapor is carried away by the current of hot acid gas. The product obtained is an anhydrous magnesium chloride of high purity. In the step just described it is not imperative that absolutely dry hydrochloric acid be used, but in order for drying to take place the proportion of water vapor relative to the acid gas should not exceed about 17 per cent. and is preferably to be held at a somewhat lower percentage. The acid gas may be diluted with an inert gas, such as air, but the proportions of acid and water vapor in such diluted atmosphere should be maintained approximately as stated.

In the foregoing procedure by carrying out stages III and IV in a current of hot air or of the products of the combustion of fuel, a product may be prepared directly containing up to about 50 per cent. anhydrous $MgCl_2$. A modified procedure wherein the drying is carried out in either one or both of said stages in vacuum yields a similar product containing a somewhat higher percentage of anhydrous chloride. Eeither of such procedures affords a marked advantage over methods heretofore practiced in that approximately 1½ molecules of the water of crystallization contained in the $2H_2O$ salt are removed directly without necessity of employing an atmosphere of hydrochloric acid for the purpose, leaving only ½ molecule of water (such water being combined with the basic chloride) to be removed in the last mentioned manner. Coincidentally thereto, approximately ½ molecule hydrochloric acid is formed and carried away in the stream of heating gases, mostly on the fourth stage of drying from $1H_2O$ salt to end product. The following graphic representation expresses the course of the reactions, leading to a product consisting of 50 per cent. $MgCl_2$ and 50 per cent. MgOHCl

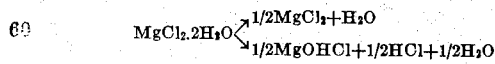

Under certain circumstances it may be desirable or preferable to conserve as much of the hydrochloric acid as is practically recoverable, in which case our invention comprehends the modified procedure of drying through stage III only in a current of air to produce the $1H_2O$ salt, and then completing the dehydration of the latter in an atmosphere of hydrochloric acid, thus combining stages IV and V in one final stage. In either case our improved process involves the novel step of drying the dihydrate, $MgCl_2.2H_2O$, substantially to the monohydrate in a current of air. The latter may then be further dehydrated in air to an end product containing from 25 to 50 per cent. or more anhydrous $MgCl_2$, such end product then being completely dehydrated in an atmosphere of hydrochloric acid, or the monohydrate may be further dehydrated directly in such atmosphere. When the dehydration in an atmosphere of hydrochloric acid is carried out at a temperature above about 280° C. at atmospheric pressure no reabsorption of water as water of crystallization takes place.

In all cases where the drying is carried out to form a certain hydrate or where a certain hydrate is employed in any step, we do not limit ourselves to a salt containing exactly the theoretical amount of water of crystallization but have used these terms (monohydrate, dehydrate, etc.) or the equivalent thereof merely to indicate approximately the relative degree of hydration at each of the designated stages.

Other modes of applying the principle of our invention may be employed instead of the one explained, change being made as regards the process herein disclosed, provided the step or steps stated by any of the following claims or the equivalent of such stated step or steps may be employed.

We therefore particularly point out and distinctly claim as our invention:—

1. A process of dehydrating magnesium chloride which comprises air-drying a partially hedydrated magnesium chloride corresponding approximately to the dihydrate at a temperature rising to about 230° C. to convert the same to a product consisting substantially of the mono-hydrate, $MgCl_2.H_2O$.

2. A process of dehydrating magnesium chloride which comprises air-drying a partially dehydrated magnesium chloride corresponding approximately to the dihydrate at a temperature rising to about 230° C., whereby a product consisting substantially of the monohydrate is formed, and continuing such heating further at a temperature between 230° and 300° C. until no more water is driven off.

3. A process of dehydrating magnesium chloride which comprises air drying a partially dehydrated magnesium chloride corresponding approximately to the dihydrate at a temperature rising to about 230° C., whereby a product corresponding approximately to the monohydrate, $MgCl_2.H_2O$, is formed, continuing such heating at a temperature between 230° and 300° C. until no more water is driven off, and finally heating such air-dried end product in an atmosphere of hydrochloric acid at a temperature of at least 280° C.

Signed by us this 17th day of June, 1929.
ALBERT KELVIN SMITH.
WILLIAM R. VEAZEY.